UNITED STATES PATENT OFFICE.

CARL SUNDSTROM, OF DETROIT, MICHIGAN, ASSIGNOR TO THE SOLVAY PROCESS COMPANY, A CORPORATION OF NEW YORK.

PROCESS OF PRODUCING A FILLING MATERIAL.

No. 796,683.     Specification of Letters Patent.     Patented Aug. 8, 1905.

Application filed June 13, 1904. Serial No. 212,348.

*To all whom it may concern:*

Be it known that I, CARL SUNDSTROM, a citizen of the United States, residing at Detroit, in the county of Wayne and State of Michigan, have invented a new and useful Process of Producing a Filling Material, of which the following is a specification.

My invention relates to improvements in the process of producing a filling material.

The object of my invention is to manufacture from natural products a filling material free from impurities and by means which shall not render such production prohibitive by reason of its cost.

Recent industries utilize in very considerable quantities materials which are naturally inert from the chemical point of view, but which by reason of their physical qualities of color, fineness, homogeneity, &c., are useful as vehicles or filling materials for the filling of rubber, paint, paper, plaster, &c.—such, for example, as sulfate of lime, sulfate of baryta, kaolin, chalk, &c.

The object of my invention is the artificial production of such materials, starting from natural products and so treating them by chemical reagents as to obtain filling material at prices which permit competition with the natural products. It is very evident that a simple grinding of the limestone or natural chalk would not accomplish the same end, because these materials, even though selected, contain quantities of impurities which interfere with the end to be attained and only produce from the raw material products of inferior quality, both as to color and composition. My process, on the contrary, consists in causing these materials to enter into a chemical combination which permits me to deal only with a compound of pure calcium, then by means of an appropriate precipitation to withdraw them from such combination. In this manner is obtained a substance which is perfectly white and of extreme lightness, with a possibility of varying the grain according to the conditions of the precipitation and according to the uses for which the product is intended.

My process consists in adding to the mother-liquor from which bicarbonote of soda has been precipitated a solution of calcium chlorid. This mother-liquor contains ammonium chlorid, ammonium bicarbonate, and sodium chlorid. Upon adding calcium chlorid calcium carbonate or precipitated chalk is thrown out. I cause a settling and filtration of the mother-liquor from which bicarbonate of soda is precipitated in the ammonia-soda process. To said mother-liquor I add solid calcium chlorid or a strong solution of calcium chlorid or the filtered liquor coming from the distillers in the ammonia-soda process. I then cause a filtration, separation, and washing of the precipitated calcium carbonate formed in the foregoing reaction. The precipitated calcium carbonate is then dried at a temperature preferably approximately between 70° and 80° centigrade. The ammonium chlorid of the mother-liquor is naturally increased somewhat by the precipitation of calcium carbonate with calcium chlorid; but in order to recover ammonium chlorid as by-product it is necessary to concentrate this filtered solution in lead pans. By cooling after evaporation ammonium chlorid is recovered.

By varying the temperatures, the concentration, the rapidity of mixture, agitation, or introducing foreign salts it is possible to largely influence the physical character of the precipitates, and thus several degrees of fineness may be obtained.

What I claim is—

1. The process of treating the mother-liquor from precipitated bicarbonate of soda in the ammonia-soda process, said liquor containing ammonium chlorid and ammonium bicarbonate, which consists in adding a calcium compound to the liquor, thereby converting the ammonium bicarbonate into ammonium chlorid and the calcium compound into calcium carbonate, filtering, separating and washing the precipitated carbonate.

2. The process of treating the mother-liquor from precipitated bicarbonate of soda in the ammonia-soda process, said liquid containing ammonium chlorid and ammonium bicarbonate, which consists in adding a calcium compound to the liquor and regulating the concentration and temperature of the solution and the speed of the reaction to control the physical character of the precipitate, thereby converting the ammonium bicarbonate into ammonium chlorid and the calcium compound into calcium carbonate, filtering, separating and washing the precipitated carbonate.

3. The process of treating the mother-liquor from precipitated bicarbonate of soda in the ammonia-soda process, said liquor containing ammonium chlorid and ammonium bicarbonate, which consists in adding a calcium compound to the liquor, regulating the concentration and temperature of the solution and regulating the speed of the reaction by the addition of foreign salts to control the physical character of the precipitate, thereby converting the ammonium bicarbonate into ammonium chlorid and the calcium compound into calcium carbonate, filtering, separating and washing the precipitated carbonate.

CARL SUNDSTROM.

Witnesses:
 JAS. MACLAURY,
 P. J. WILSON.